(12) United States Patent
Martins et al.

(10) Patent No.: US 9,790,897 B2
(45) Date of Patent: Oct. 17, 2017

(54) GAS DISTRIBUTION MANIFOLD IN THE CYLINDER HEAD OF AN ENGINE, SET COMPRISING A DISTRIBUTION MANIFOLD AND AN ENGINE CYLINDER HEAD

(75) Inventors: Carlos Martins, Le Chesnay (FR); Bertrand Gessier, Montfort l'Amaury (FR)

(73) Assignee: Valeo Systemes Thermiques, Le Mesnil Sain Denis (FR)

( * ) Notice: Subject to any disclaimer, the term of this patent is extended or adjusted under 35 U.S.C. 154(b) by 742 days.

(21) Appl. No.: 13/638,107

(22) PCT Filed: Mar. 28, 2011

(86) PCT No.: PCT/EP2011/054752
§ 371 (c)(1),
(2), (4) Date: Mar. 6, 2013

(87) PCT Pub. No.: WO2011/120933
PCT Pub. Date: Oct. 6, 2011

(65) Prior Publication Data
US 2013/0167814 A1    Jul. 4, 2013

(30) Foreign Application Priority Data
Mar. 31, 2010 (FR) ..................... 10 52405

(51) Int. Cl.
*F02M 25/07* (2006.01)
*F02M 35/10* (2006.01)
(Continued)

(52) U.S. Cl.
CPC .......... *F02M 25/072* (2013.01); *F02M 26/17* (2016.02); *F02M 26/20* (2016.02);
(Continued)

(58) Field of Classification Search
CPC ....... F02M 35/10078; F02M 35/10222; F02M 35/10321; F02M 35/10347;
(Continued)

(56) References Cited

U.S. PATENT DOCUMENTS 5,329,912 A * 7/1994 Matsumoto ........... F02F 1/4214
123/308
5,813,375 A * 9/1998 Taylor ......................... 123/73 A
(Continued)

FOREIGN PATENT DOCUMENTS

DE    100 28 131 C1    12/2001
EP    1 059 435 A2    12/2000
(Continued)

OTHER PUBLICATIONS

International Search Report issued in PCT/EP2011/054752 mailed on Apr. 27, 2011 (6 pages).
(Continued)

*Primary Examiner* — Hai Huynh
*Assistant Examiner* — Gonzalo Laguarda
(74) *Attorney, Agent, or Firm* — Osha Liang LLP (57) ABSTRACT

The invention relates to a gas distribution manifold (3) in the cylinder head of a heat engine of a motor vehicle, said manifold (3) comprising a manifold housing (31) provided with an inflow face for the inflow of an admission gas (G) and an outflow face (3B) entering the cylinder head of the engine, and an injection spout (6) for injecting a recirculated exhaust gas flow (H) of the engine into the admission gas flow (G), the manifold housing (31) and the injection spout (6) forming a single component. As the injection spout (6) comprises an open face, the manifold (3) is configured such that said open face is closed by an element outside the manifold (3), especially the cylinder head, in such a way as to form a tubular injection pipeline.

15 Claims, 4 Drawing Sheets

(51) Int. Cl.
  *F02M 35/112* (2006.01)
  *F02M 26/20* (2016.01)
  *F02M 26/17* (2016.01)
(52) U.S. Cl.
  CPC ............... *F02M 35/10078* (2013.01); *F02M 35/10222* (2013.01); *F02M 35/112* (2013.01); *Y02T 10/125* (2013.01); *Y02T 10/146* (2013.01)
(58) Field of Classification Search
  CPC .. F02M 35/1045; F02M 35/112; F02M 26/17; F02M 26/19; F02M 26/20; F05C 2225/08; F01N 3/28; F02B 37/00; F02B 3/06; F02D 2009/0276; F02D 9/1065
  USPC ........................................ 123/568.17, 568.13
  See application file for complete search history.

(56) References Cited

U.S. PATENT DOCUMENTS

| | | | | |
|---|---|---|---|---|
| 2005/0172940 | A1* | 8/2005 | Iizuka | F01L 1/053 123/635 |
| 2005/0235972 | A1* | 10/2005 | Yi | F02M 35/10085 123/568.12 |
| 2007/0017491 | A1* | 1/2007 | Maeda | 123/568.18 |
| 2007/0107708 | A1* | 5/2007 | Uchiyama et al. | 123/568.18 |
| 2011/0042599 | A1* | 2/2011 | Arai et al. | 251/251 |
| 2011/0174279 | A1* | 7/2011 | Ito | F02B 31/06 123/568.18 |

FOREIGN PATENT DOCUMENTS

| | | |
|---|---|---|
| EP | 1 533 512 A2 | 5/2005 |
| WO | 97 34081 A1 | 9/1997 |
| WO | 2008/116568 A1 | 10/2008 |

OTHER PUBLICATIONS

Written Opinion of the International Searching Authority issued in PCT/EP2011/054752 mailed on Apr. 27, 2011 (6 pages).
International Preliminary Report on Patentability from PCT/EP2011/054752 issued on Oct. 30, 2012 (7 pages).

* cited by examiner

GAS DISTRIBUTION MANIFOLD IN THE CYLINDER HEAD OF AN ENGINE, SET COMPRISING A DISTRIBUTION MANIFOLD AND AN ENGINE CYLINDER HEAD

The invention relates to the field of heat exchangers and, more particularly, the heat exchangers used in the motor vehicle domain.

A heat engine of a motor vehicle comprises a combustion chamber, generally formed by a plurality of cylinders, in which a mixture of oxidant and fuel is burned to generate the work of the engine. The gases taken into the combustion chamber are called intake gases.

In some cases, these intake gases have to be cooled before being introduced into the combustion chamber; this function is fulfilled by a heat exchanger, which is a cooler.

Conventionally, a heat exchanger comprises a heat exchange bundle formed by a plurality of exchange elements stacked between two end plates (bottom plate and top plate). The spaces between the exchange elements of the bundle form ducts for a flow of gas to be cooled, here intake gases. The exchange elements of the bundle are hollow and conduct a heat transfer fluid, intended to exchange heat with the flow of gas to be cooled circulating in the fluid ducts and thus cool it.

In order to reduce the polluting emissions, it is known practice to introduce, into the flow of intake gas, so-called "recirculated" exhaust gases. These are exhaust gases taken downstream of the combustion chamber in order to be rerouted (recirculated) to the flow of intake gas, upstream of the combustion chamber, where they are mixed with the intake gases prior to their intake into the combustion chamber. Traditionally, the recirculated exhaust gases are introduced via one or more introduction points formed in an intake duct for the gases extending between the cooler of the intake gases and the engine, in order for the recirculated exhaust gases to be mixed with the gases originating from the cooler.

A current trend aims to bring the heat exchanger as close as possible to the engine in order to gain in compactness.

Figure 1:
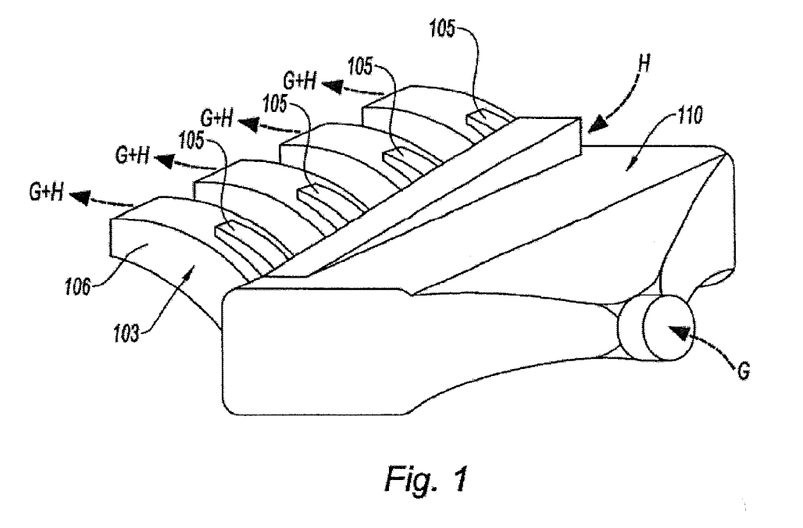
FIG. 1 represents a perspective view of a gas mixing device in an engine cylinder head according to the prior art (already discussed)
Figure 2:
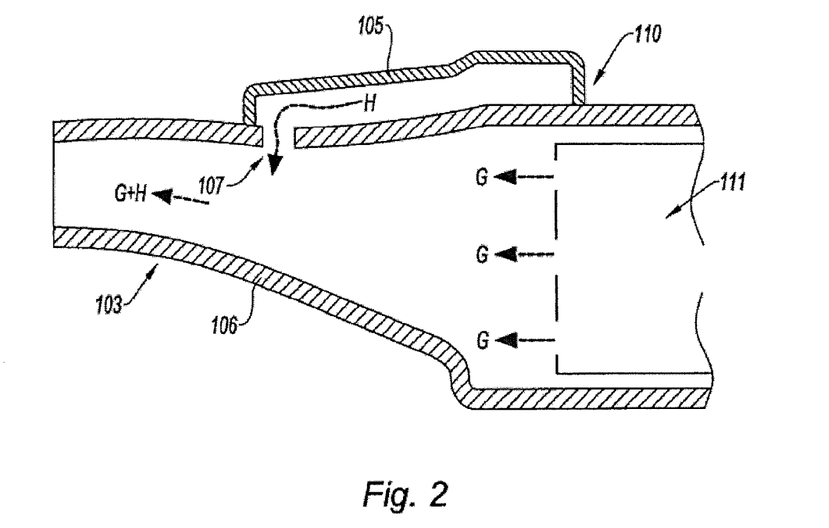
FIG. 2 represents a longitudinal cross-sectional view of the device of FIG. 1, the cross section being taken in the direction of circulation of the gases in the device (already discussed)

The patent application published under the number WO2008/116568 teaches a heat exchange module intended to be mounted on the cylinders of an internal combustion engine. With reference to FIGS. 1 and 2 representing the module of the application WO2008/116568, the heat exchange module comprises, in its upstream part 110, a heat exchange bundle 111, and in its downstream part 103, output ducts 106 arranged to be connected respectively to the cylinders of the engine.

During its operation, a flow of intake gas G is introduced via an upstream face of the exchange module to be cooled by the heat exchange bundle 111, the cooled flow then being distributed in the output ducts of the exchange module to be taken into the cylinders of the engine to which the ducts 106 are respectively connected.

Each output duct 106 of the heat exchange module, in which the flow of cooled intake gas G circulates, comprises an injection orifice 107 for a flow of recirculated exhaust gases H, which is injected by an injection duct 105 connected to the output duct 106 of the exchange module at the level of said injection orifice 107, as represented in FIG. 2. Thus, the flow of intake gas G and the flow of recirculated exhaust gases H are mixed in the output ducts 106 of the module before their intake into the cylinders of the engine. In the prior art, the introduction of the flow of recirculated exhaust gases H is performed independently in each output duct 106.

Moreover, the mixing device, formed by the heat exchange module and the injection ducts 105 which are added to it, has a significant volume. Furthermore, the structure of the existing exchange modules has to be modified significantly in order to add recirculated exhaust gas injection ducts 105 to it.

Moreover, the mixing device with its recirculated exhaust gas injection ducts is complex to manufacture. Conventionally, it is formed by a foundry method known to those skilled in the art as "sand molded casting". This foundry method makes it possible to form the cavities of the recirculated gas injection ducts of the mixing device. It conventionally comprises:
- a step of positioning a mold core in a foundry mold, the form of which is adapted to form the mixing device,
- a step of filling the foundry mold with a material forming the mixing device such as aluminum,
- a step of stripping the mixing device from the foundry mold, and
- a step of removing the mold core from the mixing device to form the cavity of the injection duct.

The multiple steps of the foundry method increase the time to manufacture the mixing device and increase its manufacturing cost.

In order to eliminate at least some of these drawbacks, the invention relates to a gas distribution manifold in the cylinder head of a heat engine of a motor vehicle, the manifold comprising a manifold housing comprising an input face for a flow of intake gas and an output face intended to open into the cylinder head of the engine, a channel for injecting a flow of recirculated exhaust gases from the engine into the flow of intake gas, the manifold housing and the injection channel forming a single-piece assembly, a manifold in which, with the injection channel having an open face, the manifold is configured so that said open face is closed by an element external to the manifold so as to form a tubular injection duct.

The distribution manifold according to the invention does not have a tubular injection duct for the flow of exhaust gases forming a cavity in the manifold housing. The manifold can advantageously be formed by a foundry method without requiring the use of a mold core. The time to manufacture the manifold is thus shortened. The expression "element external to the manifold" should be understood to mean an element which is not a structural element of said manifold and which can be added to said manifold, such as a heat exchanger or a cylinder head.

Preferably, the manifold and the injection channel are obtained by a die casting foundry method. Advantageously, the cost of manufacturing such a manifold is reduced.

According to one aspect of the invention, the injection channel is in the form of a half-shell.

Preferably, the open face of the injection channel extends parallel to the input or output face of said manifold housing. The open face can thus be closed directly from the input or output face of said manifold housing by mounting an element external to the manifold. Still preferably, the open face of said injection channel is coplanar to the input or output face of said manifold housing.

According to one aspect of the invention, the injection channel comprises at least one injection orifice arranged to inject into the manifold housing a flow of recirculated exhaust gases. Preferably, said orifice is oriented so as to inject the flow of recirculated exhaust gases in the direction opposite the flow of intake gas. Thus, a counter-current circulation of the flow of recirculated exhaust gases relative to the flow of intake gases makes it possible to form significant turbulences which enhances the homogenization of the mixture.

According to another aspect of the invention, the manifold housing comprising a through orifice intended for the passage of the recirculated exhaust gases, the injection channel opens into said through orifice. Thus, the open injection channel opens into a through orifice without forming any cavity in the output manifold which makes it possible to form a manifold with means for connecting the valve which can be formed by a foundry method that does not require a mold core.

Preferably, the manifold housing comprises a main body intended for the circulation of the flow of intake gas, and an extension body comprising a seating intended for the mounting of an intake valve for recirculated exhaust gases, the through orifice, intended for the passage of the recirculated exhaust gases, being formed in said seating.

Still preferably, the through orifice, intended for the passage of the recirculated exhaust gases, extends perpendicularly to the output face of the manifold housing.

The invention also relates to a device for mixing a flow of intake gas and a flow of recirculated exhaust gases for their intake into the cylinder head of a heat engine of a motor vehicle, the device comprising a heat exchanger comprising a gas cooling heat exchange bundle and a gas distribution manifold in the cylinder head as presented previously.

The invention also relates to an assembly of a cylinder head of a heat engine of a motor vehicle and of a gas distribution manifold in the cylinder head, the assembly comprising a tubular duct for injecting a flow of recirculated exhaust gases from the engine into the flow of intake gas formed by two complementary parts, the injection duct comprising a first part defined by the manifold and a second part defined by the cylinder head, the first or the second part of the injection duct comprising an open face configured to be closed by said other complementary part so as to form the tubular injection duct.

By virtue of the invention, the flow of recirculated exhaust gases is injected directly at the output of the output manifold, which advantageously makes it possible to mix the flow of recirculated exhaust gases with the flow of cooled intake gases before the mixture penetrates into the cylinders of the engine.

Preferably, the distribution manifold of the assembly is the distribution manifold as presented previously.

According to a first aspect, the cylinder head comprises a cylinder head body comprising a planar surface arranged to close the open face of the injection channel of the output manifold.

According to a second aspect, the cylinder head comprises a cylinder head body comprising a cylinder head channel arranged to close the open face of the injection channel of the output manifold so as to form a tubular injection duct, the volume of which is shared between the manifold and the cylinder head.

Thus, one and the same output manifold can be mounted with different kinds of cylinder head. This makes it possible to adapt the injection of recirculated exhaust gases according to the needs of the engine.

According to a third aspect, the cylinder head comprising a channel for injecting a flow of recirculated exhaust gases from the engine into the flow of intake gas, the injection channel comprising an open face, the distribution manifold comprises a manifold housing arranged to close the open face of the injection channel of the cylinder head.

According to this aspect of the invention, the flow of recirculated exhaust gases circulates only in the cylinder head of the engine, the output manifold simply closing the injection channel of the cylinder head.

Preferably, the cylinder head comprising a duct for the intake of gas into the cylinder head to feed the cylinders of the engine, the injection duct of the cylinder head comprises injection means linking the injection channel to the injection duct.

The invention also relates to an assembly of a cylinder head of a heat engine of a motor vehicle and of a device for mixing a flow of intake gas and a flow of recirculated exhaust gases for their intake into the cylinder head, said device comprising:
- a heat exchanger comprising a gas cooling heat exchange bundle and
- a gas distribution manifold in the cylinder head, the manifold comprising:
  - a manifold housing comprising an input face for a flow of intake gas and an output face intended to open into the cylinder head of the engine;
  - a channel for injecting a flow of recirculated exhaust gases from the engine into the flow of intake gas, the manifold housing and the injection channel forming a single-piece assembly;
  - with the injection channel having an open face, the manifold is configured so that said open face is closed by said cylinder head so as to form a tubular injection duct.

The invention will be better understood using the following description of the preferred embodiment of the device of the invention, with reference to the appended drawing, in which.

Figure 3:
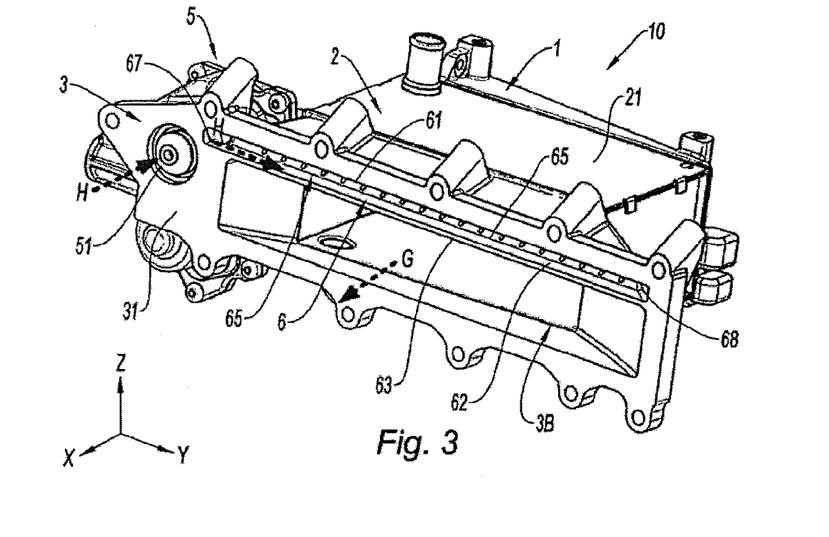
FIG. 3 represents a perspective view of the gas mixing device according to the invention comprising an input manifold, a heat exchanger, an output manifold and an intake valve for taking recirculated exhaust gases into the device, the device being seen substantially from the front, that is to say, the cylinder head side.
Figure 5:
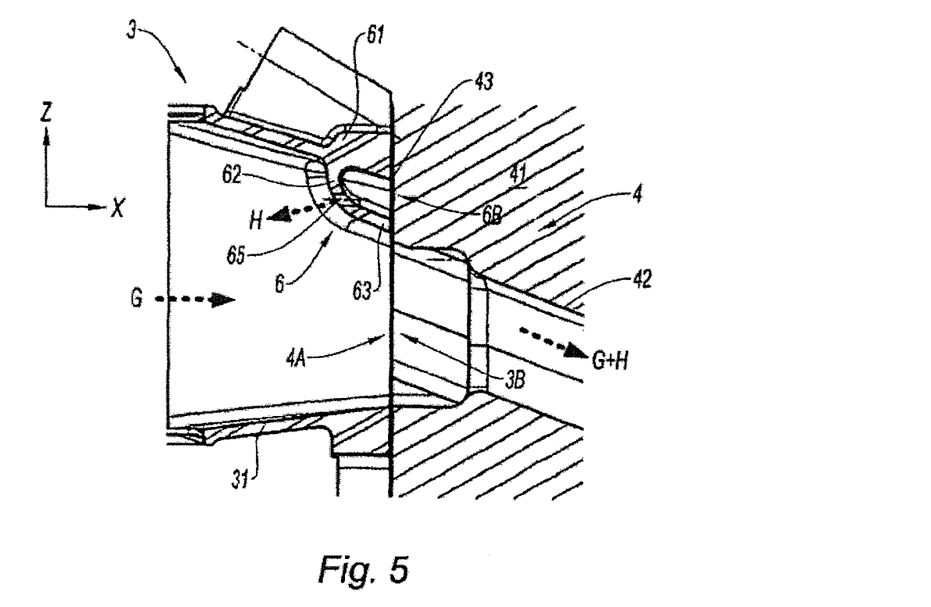
FIG. 5 represents a longitudinal cross-sectional view of the output manifold of the device of FIG. 3 linked to a first embodiment of a cylinder head of an engine, the cross section being taken in the direction of circulation of the gases in the device.
Figure 6:
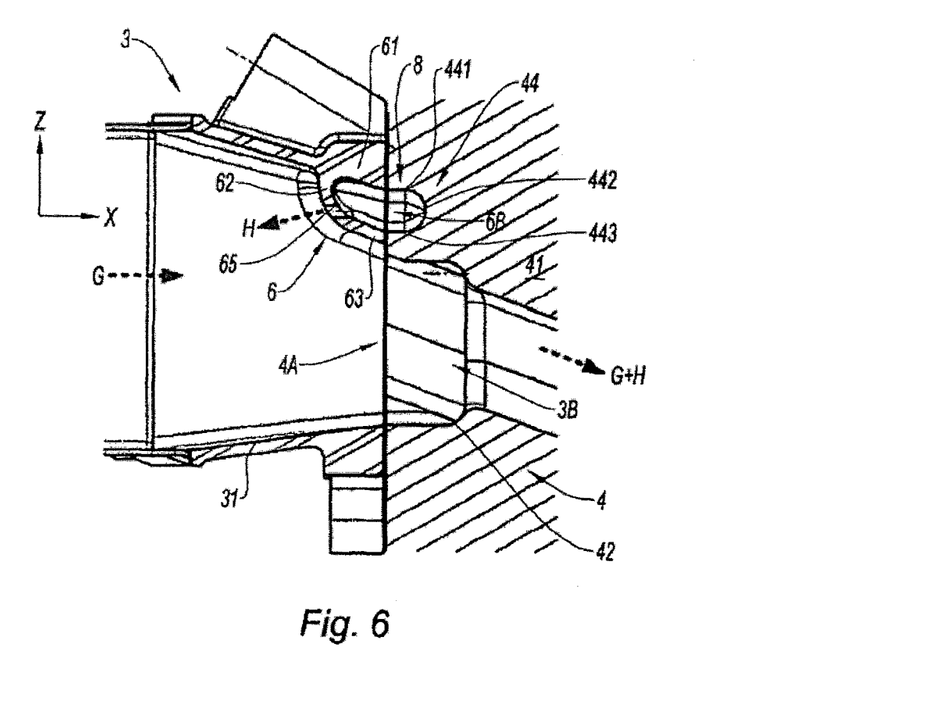
FIG. 6 represents a longitudinal cross-sectional view of the output manifold of the device of FIG. 3 linked to a second embodiment of a cylinder head of an engine, the cross section being taken in the direction of circulation of the gases in the device.

With reference to FIG. 3, a device 10 for mixing and distributing a flow of gas in the cylinder head of a heat engine of a motor vehicle (represented in FIGS. 5 and 6)

comprises a heat exchanger 2 comprising a heat exchange bundle arranged to exchange heat with a first flow of gas (G), here, of the intake gases comprising air, circulating in the heat exchange bundle.

Hereinafter, the terms "upstream" and "downstream" are defined in relation to the direction of circulation of the flow of intake gas (G) in the mixing device 10, the intake gases (G) circulating from upstream to downstream in the device 10 in a direction X of circulation of the gases represented in FIGS. 3 and 4.

The intake gases (G) are introduced into the heat exchanger 2 by an input manifold 1, mounted upstream of the heat exchanger 2, and exhausted via an output manifold 3, also called distribution manifold 3, mounted downstream of the heat exchanger 2 and intended to be linked to the cylinder head 4 of the engine. The distribution manifold 3 allows for a distributed intake, in the cylinder head 4, of the flow of cooled gas (G) from the heat exchanger 2.

The mixing device 10 also comprises a duct 8 for injecting a flow of recirculated exhaust gases from the engine (H) known to those skilled in the art by the English abbreviation "EGR", standing for "exhaust gas recirculation".

In a first embodiment of the mixing device 10, with reference to FIGS. 5 and 6, the injection duct 8 is formed between the output manifold 3 and the cylinder head 4 so as to inject the flow of recirculated exhaust gases (H) into the flow of intake gas (G) upstream of the cylinder head 4.

In order to clearly understand the invention, each element of the mixing device according to the invention will be described individually both in its structure and in its function.

Heat Exchanger

Figure 4:
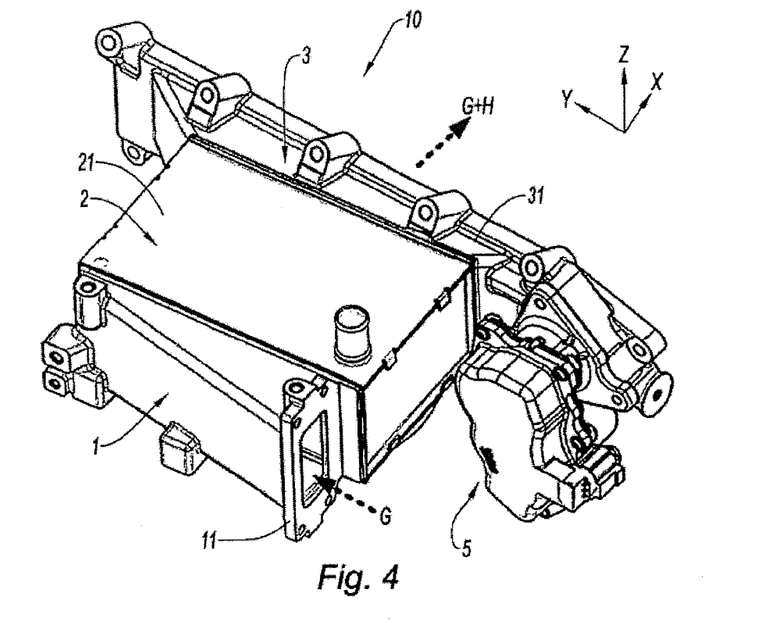
FIG. 4 represents a perspective view of the mixing device of FIG. 3, the device being seen substantially from the rear.

With reference to FIGS. 3 and 4, the heat exchanger 2 comprises an exchanger housing 21 jacketing a heat exchange bundle comprising a plurality of stacked exchange elements (not represented). The spaces between the exchange elements of the bundle form ducts for the flow of gas to be cooled (G), here the intake gases. The exchange elements of the bundle are hollow and convey a heat transfer fluid, intended to exchange heat with the flow of gas to be cooled (G) circulating from upstream to downstream in the fluid ducts.

The heat exchange bundle takes the form of a parallelepiped extending lengthwise in the direction X of circulation of the gases and comprising an upstream input face through which the intake gases to be cooled (G) are introduced and a downstream output face through which the cooled intake gases (G) are exhausted.

Hereinafter, the terms "top", "bottom", "left" and "right" are defined in relation to the orientation of the mixing device 10 represented in perspective in FIG. 3 and in accordance with the orthogonal coordinate system of axes (X, Y, Z), the axis X being oriented from upstream to downstream and corresponding to the direction X of flow of the gases, the axis Y being oriented from left to right and the axis Z being oriented from bottom to top, that is to say from the bottom part of the device to its top part.

Input Manifold

The input manifold 1, represented in FIG. 4, makes it possible to guide and distribute the flow of gas to be cooled (G) over the total surface of the input face of the heat exchange bundle. To this end, the input manifold 1 is in the form of a housing that is roughly flared from upstream to downstream, the downstream end of which is linked to the upstream end of the exchanger housing 21. The input manifold 1 comprises an output face opening onto the input face of the heat exchanger 2, and an input orifice 11, for example situated laterally, that is to say, in a plane situated perpendicularly to its output face, through which the intake gases to be cooled (G) are introduced into the input manifold 1.

Distribution Manifold

Figure 8:
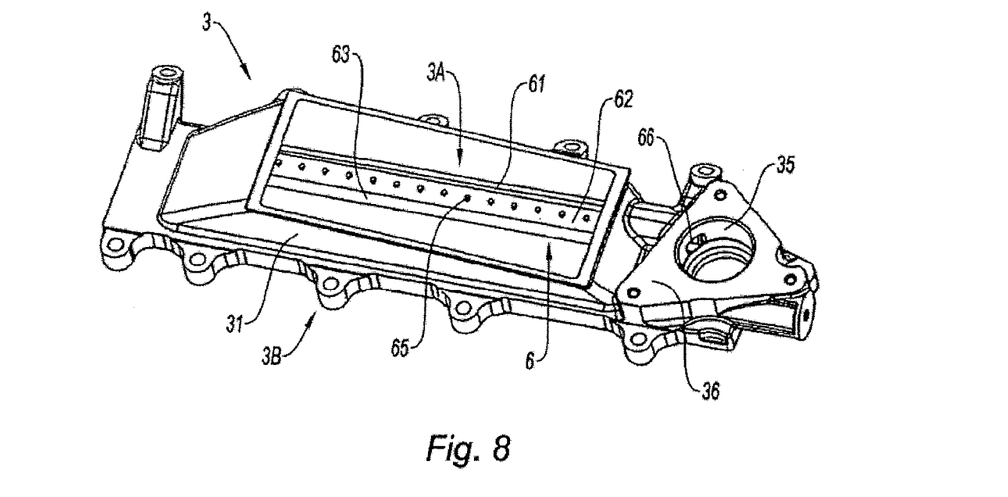
FIG. 8 represents a perspective view of the output manifold of FIG. 3, the output manifold being seen substantially from the front.

With reference to FIGS. 4 and 8, the distribution manifold 3, also called output manifold 3, mounted downstream of the heat exchanger 2, comprises an intake gas (G) input face 3A into which the output face of the heat exchange bundle of the exchanger 2 opens, and an output face 3B intended to be linked to the gas intake face of the cylinder head 4.

The output manifold 3 comprises a manifold housing 31 guiding the gases introduced from the input face 3A of the output manifold 3 to the cylinder head of the engine 4 via the output face 3B.

As indicated previously, the tubular injection duct 8 of the mixing device 10 is arranged at the interface between the output manifold 3 and the cylinder head 4. The tubular injection duct 8 is formed from two distinct parts, a first part attached to the housing of the output manifold 31 and a second part attached to the cylinder head of the engine 4.

The part of the tubular injection duct 8 which is attached to the housing 31 of the output manifold 3 is, in this embodiment of the mixing device 10, in the form of a recirculated exhaust gas injection channel 6. The injection channel 6 is arranged to inject a flow of recirculated exhaust gases (H) into the flow of cooled gases (G) so that the two gas flows (G, H) are mixed. In this example, the injection channel 6 extends at the downstream end of the output manifold 3, inside the manifold housing 31, along the top wall of the manifold housing 31 as represented in FIG. 3. The injection channel 6 here extends rectilinearly from left to right in the entire length of the top wall of the manifold housing 31.

With reference to FIG. 8, the manifold housing comprises a main body intended for the circulation of the flow of intake gas (G), and an extension body comprising a seating 36 intended for the mounting of an intake valve 5.

Figure 7:
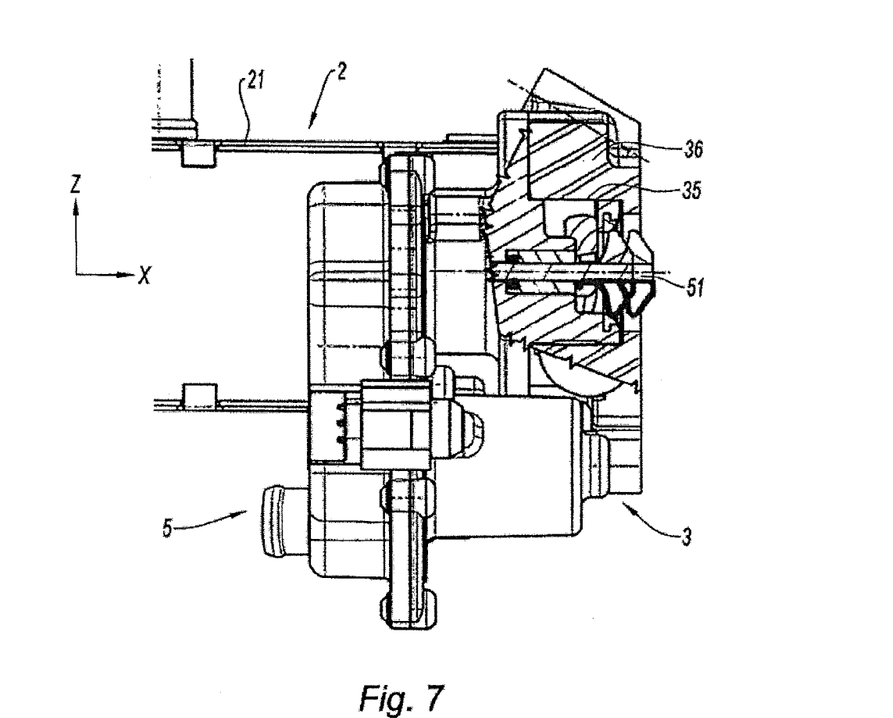
FIG. 7 represents a longitudinal cross-sectional view of the recirculated exhaust gas intake valve of the device of FIG. 3.

With reference to FIG. 8, the output manifold 3 comprises an input for the intake of a flow of recirculated exhaust gases (H) from the engine. Said intake input is in the form of an orifice 35 passing through the manifold housing 31, for example in the direction X, so as to allow for the passage of the recirculated exhaust gases, the through orifice 35 being formed in the seating 36 of the extension body. The intake valve 5, represented in detail in FIG. 7, comprises an intake valve 51 which is housed in the intake orifice 35 of the output manifold 3 so as to allow, after opening, a passage of a portion of the flow of recirculated exhaust gases (H) in the injection channel 6 of the output manifold 3. To this end, the injection channel 6 comprises, at its left end, an input orifice 66 opening into the intake orifice 35 of the extension body of the output manifold 3.

Advantageously, with reference to FIG. 8, the input orifice 66 of the injection channel 6 extends obliquely in relation to the direction Y so as to allow for a mold stripping of the output manifold 3 obtained by a die casting method.

However, the input orifice 66 of the injection channel 6 could also extend in the direction Y, cavity-forming means then having to be used in the die casting method. However, such cavity-forming means can be used only for an orifice with a short length, here of the order of the value of its diameter.

With reference to FIG. 5, the injection channel 6 is in the form of a half-shell and comprises an outer wall 61 extending in the direction X, a bottom wall 62 extending in the direction Y and an inner wall 63 extending in the direction X.

The outer wall 61 of the injection channel 6 is here formed by the wall of the manifold housing 31. The bottom 62 and inner 63 walls extend in the manifold housing 31, the inner wall 63 extending substantially parallel to the outer wall 61 and the bottom wall 62 linking said inner 63 and outer 61 walls. In other words, the injection channel 6 has a U-section, in which the open end of the U is oriented in the downstream direction. The injection channel 6 is closed at its left end by a left wall 67 extending substantially parallel to the plane (X, Z) which is pierced by the input orifice 66 in order to connect the volume of the injection channel 6 with the volume of the through orifice 35 intended for the passage of recirculated exhaust gases. The injection channel 6 is closed at its right end via a right wall 68, extending substantially parallel to the plane (X, Z), defined in the right lateral wall of the manifold housing 31.

The injection channel 6 comprises an open face 6B, corresponding to the open end of the U, which is configured to be closed by the cylinder head 4 so as to form a tubular injection duct 8. With reference to FIGS. 5 and 6, the open face 6B of the injection channel 6 is coplanar to the output face 3B of the manifold housing 31. In other words, the downstream end of the inner wall 63 of the injection channel 6 extends longitudinally in the direction X to the output face 3B of the output manifold 3.

Because of the form of the injection channel 6, the output manifold 3 can be obtained by a die casting foundry method in which a molten metal is injected under pressure between dies defining the form and the dimensions of the output manifold 3. By virtue of the form of the injection channel 6 which comprises an open face 6B and which has no cavity, the output manifold 3 can be formed without the need for a mold core.

To form the injection channel 6, a first casting die follows the upstream surface of the injection channel 6 whereas a second casting die follows its downstream surface. The injection channel 6 is thus formed simply and rapidly. The die casting method makes it possible to shorten the time to manufacture the output manifold 3 and, consequently, reduce the cost of such an output manifold 3, which is very advantageous.

With reference to FIG. 3, the injection duct 6 extends transversely to the direction X of circulation of the gases and comprises injection means formed in the injection channel 6 in order to inject the flow of recirculated exhaust gases (H) into the flow of cooled gases (G). With reference to FIG. 3, the injection means are in the form of a plurality of injection orifices 65 oriented in the upstream direction. In other words, the injection orifices 65 are oriented counter-current to the flow of intake gases (G) so as to form significant turbulences. This advantageously makes it possible to promote the shearing of the flow of cooled gases (G) by the flow of exhaust gases (H).

A plurality of injection orifices have been described here, but it goes without saying that the injection means could also take the form of a longitudinal slot.

The output manifold can advantageously be formed by a die casting method and be stripped from the mold from the front, that is to say, from the output face 3B of the output manifold. In this example, the injection orifices 65 of the injection channel are machined following the stripping of the output manifold 3 from the mold.

As indicated previously, the injection duct 8 comprises a part attached to the cylinder head 4 arranged to close the open face 6B of the injection channel 6.

Engine Cylinder Head

With reference to FIGS. 5 and 6, the cylinder head 4 of the engine comprises a cylinder head body 41 in which is formed an intake duct 42 arranged to conduct the gases from the output manifold 3 to the cylinders of the engine. The intake duct 42 has an input face 4A, the dimensions of which correspond to the output face 3B of the output manifold 3.

According to a first embodiment of the cylinder head represented in FIG. 5, the second part of the injection duct 8, which is attached to the cylinder head 4, is formed by a planar surface 43 of the cylinder head body 41.

With reference to FIG. 5, when assembling the output manifold 3 with the cylinder head 4, the injection channel 6, formed at the downstream end of the housing of the manifold 31, comes into contact with the planar surface 43 of the cylinder head body 41, the planar surface 43 of the cylinder head 4 closing the open face 6B of the injection channel 6 to form a tubular injection duct 8 formed upstream by the injection channel 6 and downstream by the planar surface 43 of the cylinder head body 41. The tubular duct 8 has a substantially U-shaped section.

A second embodiment of the cylinder head 4 is described with reference to FIG. 6. The references used to describe the elements with structures or functions identical, equivalent or similar to those of the elements of FIG. 5 are the same, in order to simplify the description. Moreover, not all of the description of the embodiment of FIG. 5 is repeated, that description applying to the elements of FIG. 6 when there are no incompatibilities. Only the notable structural and functional differences are described.

According to the second embodiment of the cylinder head represented in FIG. 6, the second part of the injection duct 8, which is attached to the cylinder head 4, is formed by a cylinder head channel 44, taking the form of a half-shell, which complements the injection channel 6.

Still with reference to FIG. 6, the cylinder head channel 44 is formed in the cylinder head body 41 and comprises an outer wall 441 extending in the direction X, a bottom wall 442 extending in the direction Y and an inner wall 443 extending in the direction X. The injection channel 6 and the cylinder head channel 44 cooperate by complementarity of forms to form the tubular injection duct 8. To this end, when the output manifold 3 is mounted on the cylinder head 4, the outer 63, 443 and inner 61, 441 walls of the injection 6 and cylinder head 44 channels are continuous to form a tubular duct of substantially oval section as represented in FIG. 6.

In this second embodiment of the cylinder head 4, the cylinder head channel 44 makes it possible to increase the volume of the tubular injection duct 8 by dividing up said volume between the output manifold 3 and the cylinder head 4. It goes without saying that various forms of cylinder head 4 can be used to close the injection channel 6.

The output manifold 3 and the cylinder head 4 are here attached to one another, for example, by mechanical means such as screwing or similar.

The invention has been described here with an injection duct 8 formed between the distribution manifold 3 and the cylinder head 4 of the engine. However, the tubular injection duct 8 can be formed between the distribution manifold 3 and the heat exchanger 2.

According to this alternative, in a second embodiment of the output manifold 3, the injection channel 6 is formed at the upstream end of the output manifold 3 and comprises an open face which is coplanar to the input face 3A of the output manifold 3 so as to be able to be closed by the exchanger housing 21. According to this alternative, the exchanger housing may comprise a planar surface or an exchanger channel which would complement the injection channel 6 of the output manifold 3 so as to close the injection channel 6 in the manner of the cylinder head 4 as explained previously.

Generally, in order to distribute the exhaust gases (H) in an even more uniform manner in the area of their injection, the injection means of the injection duct 8 could open onto several sides of the manifold housing 31.

According to a third embodiment of the invention, which is not represented, the tubular injection duct 8 is formed at the interface between the output manifold 3 and the cylinder head of the engine and the injection channel is formed in the cylinder head of the engine 4 and has an open face configured to be closed by the output manifold 3.

The output manifold 3 comprises a part complementing said injection channel of the cylinder head, the complementing part being formed at the downstream end of the manifold housing 31 and being defined by a material thickness of said housing 31, that is to say, outside the flow of intake gas (G). The complementing closure part can have a straight section to close the opening face of the injection channel by a planar surface or a U-shaped section open in the downstream direction so as to increase the volume of the injection duct 8. In other words, this third embodiment of the invention corresponds to the embodiment of FIG. 5, except that it is the output manifold 3 which closes the injection channel formed in the cylinder head 4. It goes without saying that various forms of output manifold 3 can be used to close the injection channel formed in the cylinder head 4.

In this third embodiment, the injection channel of the cylinder head 4 is linked to a recirculated exhaust gas supply system internal to the cylinder head and known to those skilled in the art. In a manner similar to the preceding embodiments, the injection channel comprises injection means that can take the form of orifices or of a slot. In this embodiment, the injection means are formed in the cylinder head body 41 so as to link the injection channel to the intake duct 42 of the cylinder head 4. Thus, the recirculated exhaust gases from the engine are directly reinjected into the flow of intake gas from the cylinder head without circulating in the output manifold 3.

The distribution manifold and the cylinder head 4 are here attached to one another, for example by welding, hard soldering or by mechanical means such as screwing or similar.

An implementation of the invention will now be presented with reference to FIG. 5.

Implementation

During the operation of the mixing device 10 according to the invention, a flow of intake gas to be cooled (G) is introduced through the input orifice of the input manifold 1 and circulates from upstream to downstream in the heat exchange bundle, in the direction X of circulation of the gases, to be cooled. The flow of cooled intake gases (G) then circulates in the output manifold 3.

At the output face 3B of the output manifold 3, the flow of cooled intake gases (G) is sheared by the flow of recirculated exhaust gases (H) injected in the reverse direction to that of the flow of cooled gases. The turbulences generated by the shearing in the area of confluence of the gases (H, G) favor the mixing of the flows of gas to form a homogeneous flow of gas which is taken into the cylinders of the engine via the cylinder head 4.

Thus, the device according to the invention makes it possible to obtain a homogeneous mixture of the gases taken into the cylinder head 4 of the engine while combining compactness, effectiveness and efficiency. Furthermore, the device can be mounted simply and quickly.

The invention has been described with an injection channel comprising an open face coplanar either to the output face, or to the input face of the output manifold 3. It goes without saying that the open face could be only parallel to one of said faces without, however, being in the same plane. In other words, the open face is axially offset relative to said face. The complementary part of the injection duct, formed on the heat exchanger or on the cylinder head, is then offset axially relative to the input face of the cylinder head or the output face of the manifold so as to close the open face of the injection channel of the manifold. Furthermore, the open face of the injection channel can be inclined relative to the output face or the input face of the manifold, the important thing being that said open face is adapted to be closed by the engine cylinder head 4, the heat exchanger 2 or any other element external to the output manifold 3 to form a tubular injection duct 8. Preferably, the external element closes the injection channel via the input or output face of the output manifold.

The invention claimed is:

1. A gas distribution manifold in a cylinder head of a heat engine of a motor vehicle, the manifold comprising:
   a manifold housing comprising an input face for a flow of intake gas and an output face that opens into the cylinder head of the engine;
   an injection channel for injecting a flow of recirculated exhaust gases from the engine into the flow of intake gas, the manifold housing and the injection channel forming a single-piece assembly;
   wherein, with the injection channel having an open face, the manifold is configured so that said open face contacts an element external to the manifold to form a tubular injection duct, the element being the cylinder head,
   wherein the manifold housing comprises a through orifice that passes the recirculated exhaust gases that merge and flow into the cylinder head, and the injection channel opens into said through orifice, and
   wherein the injection channel is perpendicular to the tubular injection duct.

2. The manifold as claimed in claim 1, wherein the manifold and the injection channel are obtained by a die casting foundry method.

3. The manifold as claimed in claim 1, wherein the injection channel is in the form of a half-shell.

4. The manifold as claimed in claim 1, wherein the open face of the injection channel extends parallel to the output face of said manifold housing.

5. The manifold as claimed in claim 4, wherein the open face of said injection channel is coplanar to the output face of said manifold housing.

6. The manifold as claimed in claim 1, wherein the injection channel comprises at least one injection orifice arranged to inject into the manifold housing a flow of recirculated exhaust gases.

7. The manifold as claimed in claim 1, wherein the manifold housing comprises:
   a main body that circulates the flow of intake gas, and
   an extension body comprising a seating that mounts an intake valve for the recirculated exhaust gases, the through orifice for the passage of the recirculated exhaust gases being formed in said seating.

8. The manifold as claimed in claim 7, wherein the through orifice for the passage of the recirculated exhaust gases extends perpendicularly to the output face of the manifold housing.

9. A device for mixing a flow of intake gas and a flow of recirculated exhaust gases for their intake into a cylinder head of a heat engine of a motor vehicle, the device comprising:
   a heat exchanger comprising a gas cooling heat exchange bundle; and
   a gas distribution manifold in the cylinder head as claimed in claim 1.

10. An assembly of a cylinder head of a heat engine of a motor vehicle and of a gas distribution manifold in the cylinder head, the assembly comprising:
   a tubular injection duct for injecting a flow of recirculated exhaust gases from the engine into the flow of intake gas formed by two complementary parts,
   the injection duct comprising a first part defined by the manifold and a second part defined by the cylinder head, the first or the second part of the injection duct comprising an open face configured to be closed by said other complementary part so as to form the tubular injection duct,
   wherein the manifold comprises a manifold housing, the manifold housing having a through orifice that passes the recirculated exhaust gases that merge and flow into the cylinder head,
   wherein the cylinder head comprises an injection channel that opens into said through orifice, and
   wherein the injection channel is perpendicular to the tubular injection duct.

11. The assembly as claimed in claim 10, wherein the cylinder head comprises a cylinder head body comprising a planar surface arranged to close the open face of the injection channel of the output manifold.

12. The assembly as claimed in claim 10, wherein the cylinder head comprises a cylinder head body comprising a cylinder head channel arranged to close the open face of the injection channel of the output manifold so as to form a tubular injection duct, the volume of which is shared between the manifold and the cylinder head.

13. The assembly as claimed in claim 10, wherein the injection channel is for injecting a flow of recirculated exhaust gases from the engine into the flow of intake gas and the injection channel comprises an open face, and wherein the manifold housing is arranged to close the open face of the injection channel of the cylinder head.

14. The manifold as claimed in claim 1, wherein the flow of intake gas is parallel in direction to a length of the injection channel at an interface of the manifold and the cylinder head.

15. The manifold as claimed in claim 1, wherein the recirculated exhaust gases exits the injection channel through a plurality of through orifices.

* * * * *